United States Patent [19]
Kamioka

[11] Patent Number: 6,124,948
[45] Date of Patent: *Sep. 26, 2000

[54] SYNCHRONIZATION DETECTING METHOD IN SCANNING WITH MULTI-OPTICAL BEAMS AND MULTI-OPTICAL BEAM SCANNING APPARATUS

[75] Inventor: Makoto Kamioka, Kasuga, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/876,363

[22] Filed: Jun. 16, 1997

[30] Foreign Application Priority Data

Jun. 20, 1996 [JP] Japan ..................... 8-159363

[51] Int. Cl.$^7$ ..................................... H04N 1/36
[52] U.S. Cl. .................... 358/409; 346/107.1; 346/107.4
[58] Field of Search ................... 358/401, 409, 358/410, 411, 412, 471, 475, 480, 481, 482; 346/107.1, 107.3, 107.4, 114; 347/229, 233, 234, 235

[56] References Cited

U.S. PATENT DOCUMENTS

| | | | |
|---|---|---|---|
| 4,837,588 | 6/1989 | Imakawa | 346/108 |
| 4,847,492 | 7/1989 | Houki | 250/235 |
| 5,216,524 | 6/1993 | Kitamura | 358/483 |
| 5,233,368 | 8/1993 | Yamanaka | 346/108 |
| 5,754,214 | 5/1998 | Okino | 347/229 |

*Primary Examiner*—Jerome Grant, II
*Attorney, Agent, or Firm*—Stevens, Davis, Miller & Mosher, L.L.P.

[57] ABSTRACT

A multi-optical beam scanning apparatus for scanning by a plurality of optical beams has a synchronization detector 6 including light receiving sensors 7a and 7b having light receiving surfaces juxtaposed in a main scanning direction of the plurality of optical beams. Synchronization of write timings in the main scanning direction of the plurality of beams is detected on the basis of signals obtained from the light receiving sensors 7a and 7b under a predetermined condition, so that accuracy of the synchronization detection is improved and the synchronization adjustment is facilitated.

16 Claims, 8 Drawing Sheets

OUTPUT OF
SENSOR 7a

OUTPUT OF
SENSOR 7a

SYNCHRONIZATION DETECTING METHOD IN SCANNING WITH MULTI-OPTICAL BEAMS AND MULTI-OPTICAL BEAM SCANNING APPARATUS

BACKGROUND OF THE INVENTION

1. Field of the Invention

The present invention relates to an optical system for scanning by optical beams for electrophotography or the like in which scanning with optical beams are made to form an image.

2. Description of the Related Art

Heretofore, an optical beam scanning apparatus is used as an image writing device in the electro-photographic process and is mounted in a laser printer, a laser facsimile or the like which is an output unit of a computer and a facsimile. Recently, in order to further improve the high-speed operation and the high resolution, a demand for the scanning apparatus using a plurality of optical beams is being increased.

Figure 7:
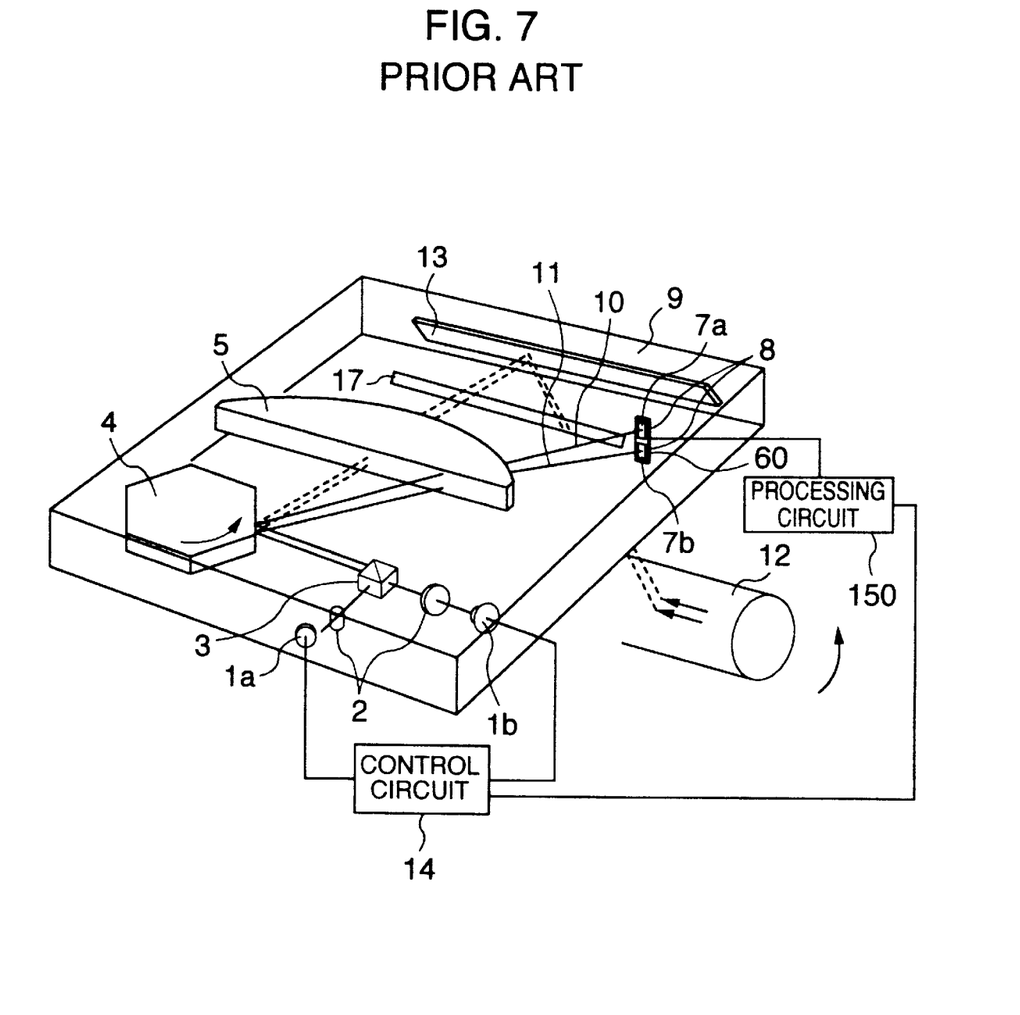
FIG. 7 is a schematic diagram illustrating a conventional multi-optical beam scanning apparatus.

FIG. 7 is a schematic diagram illustrating a conventional multi-optical beam scanning apparatus for making scanning with two optical beams.

In FIG. 7, the conventional multi-optical beam scanning apparatus includes first and second optical sources 1a and 1b for emitting optical beams, shaping lenses 2 for shaping the optical beams from the optical sources 1a and 1b, a beam splitter 3 for directing the optical beams emitted from the shaping lenses 2 toward a predetermined position, a deflector 4 for deflecting the optical beams from the beam splitter 3, a scanninglens 5 for focusing the optical beams deflected by the deflector 4 on a surface 12 to be scanned, a synchronization detector 60 for detecting synchronization of the optical scanning beams, light receiving sensors 7a and 7b for receiving optical beams for the reference of the detection of synchronization by the synchronization detector 60, slits 8 formed in front of the light receiving sensors 7a and 7b, a housing 9 for accommodating above-mentioned constituents of the apparatus, and a mirror 13 for reflecting write optical beams from the scanning lens 5 through a window 17 of the housing 9 onto the surface 12 to be scanned. The optical beams of the optical sources 1a and 1b are subjected to the modulation control by a control circuit 14, and a processing circuit 150 computes to detect the synchronization of a write timing from a signal from the synchronization detector 60 to control the control circuit 14.

In the prior art configuration, since the light receiving sensors 7a and 7b are arranged or juxtaposed in a perpendicular direction (sub-scanning direction), as shown in FIG. 7, to the scanning direction (main scanning direction) of the plurality of optical beams, detection positions of the synchronization may be slightly varied and different depending on mounting of the light receiving sensors 7a and 7b and it is difficult to pertinently position the light receiving sensors with respect to the optical beams slightly separated from each other in the sub-scanning direction. Accordingly, a writing position by scanning of each of optical beams 10 and 11 tends to be deviated due to such variations in the synchronization detection positions, so that there is the possibility that fluctuation is produced in a formed image and the image is deteriorated remarkably.

In order to cope with the above problem, it is necessary to finely adjust write timings for two optical beams in each multi-optical beam scanning apparatus provided in the subsequent stage to the synchronization detector 60 and the light receiving sensors are required to be mounted with high accuracy.

Particularly, since the space between pixels in the sub-scanning direction is narrowed as the resolution is increased and for example, for 600 dpi, the space is as small as about 42 μm. Accordingly, the space between a plurality of scanning beams is also narrow and there is a problem that the mounting accuracy of the light receiving sensors 7a and 7b in the sub-scanning direction is high so that the mounting is difficult and adjacent optical beams tend to be detected in error.

SUMMARY OF THE INVENTION

It is an object of the present invention to solve the above problems in the prior art by providing a synchronization detecting method in scanning with multi-optical beams and a multi-optical beam scanning apparatus capable of easily detecting synchronization of a plurality of optical scanning beams to synchronize write timings for image by beams.

In order to solve the above problems, according to the present invention, a synchronization method is determined such that a plurality of light receiving elements are arranged side by side in the main scanning direction of a plurality of optical scanning beams in order to form light receiving sensors and synchronization of write timings of scannings for the plurality of optical beams is computed on the basis of signals obtained from the plurality of light receiving elements, thereby providing a synchronization detecting method in scanning with multi-optical beams capable of facilitating the synchronization detection.

Further, according to the present invention, since the plurality of light receiving elements are arranged side by side in the main scanning direction in which scanning is made with the plurality of optical beams and a synchronization detector detects synchronization for write timings of the plurality of optical beams on the basis of detection signals of the plurality of light receiving elements, there is provided a multi-optical beam scanning apparatus capable of detecting synchronization for write timings of the plurality of optical beams exactly and easily and increasing the degree of freedom for arrangement of the light receiving elements.

BRIEF DESCRIPTION OF THE DRAWINGS

FIGS. 2(a) to 2(h) are schematic diagrams for illustrating a synchronization detecting method of optical beam according to the multi-optical beam scanning apparatus of the present invention;

FIGS. 3(a) to 3(e) are schematic diagrams further illustrating the synchronization detecting method of optical beam according to the multi-optical beam scanning apparatus of the present invention;

FIGS. 4(a) to 4(c) are schematic diagrams further illustrating the synchronization detecting method of optical beam according to the multi-optical beam scanning apparatus of the present invention;

DESCRIPTION OF THE PREFERRED EMBODIMENT

According to a first aspect of the present invention, there is provided a synchronization detecting method in scanning with multi-optical beams in which light receiving sensors including a plurality of light receiving elements arranged side by side in a main scanning direction in which scanning is made with a plurality of optical beams are used to detect synchronization of write timings for the plurality of optical scanning beams on the basis of outputs of the light receiving sensors under a predetermined condition. Even if incident circumstances of the plurality of optical scanning beams on the synchronization detector are different in each optical scanning system of multi-optical beams, the synchronization detection method suitable for scanning with the optical beams is provided.

According to a second aspect of the present invention, there is provided a multi-optical beam scanning apparatus comprising a plurality of optical sources for emitting optical beams, a control circuit for controlling the plurality of optical sources, a deflector for deflecting the optical beams emitted from the optical sources, a synchronization detector including a plurality of light receiving elements arranged side by side in a main scanning direction of the optical beams deflected by the deflector and for detecting synchronization of write timings for the plurality of optical beams on the basis of detection signals of the plurality of light receiving elements, and a processing circuit for processing synchronization detecting signals for the plurality of optical sources. The synchronization detection and the mounting of the light receiving sensors therefor with respect to each optical scanning beam can be facilitated.

According to a third aspect of the present invention, slits disposed on the incident side of the optical beams of the plurality of light receiving elements in the synchronization detector are formed in parallel to a sub-scanning direction perpendicular to the main scanning direction of the optical beams and accordingly the accuracy of synchronization detection in the scanning direction of the light receiving sensors can be improved by the slits.

According to a fourth aspect of the present invention, since the plurality of light receiving elements of the synchronization detector are formed integrally on a single substrate, the light receiving sensors of synchronization detection for the optical scanning beams can be configured into one chip, thereby obtaining a higher mounting accuracy and the synchronization detection can be facilitated.

Figure 1A:
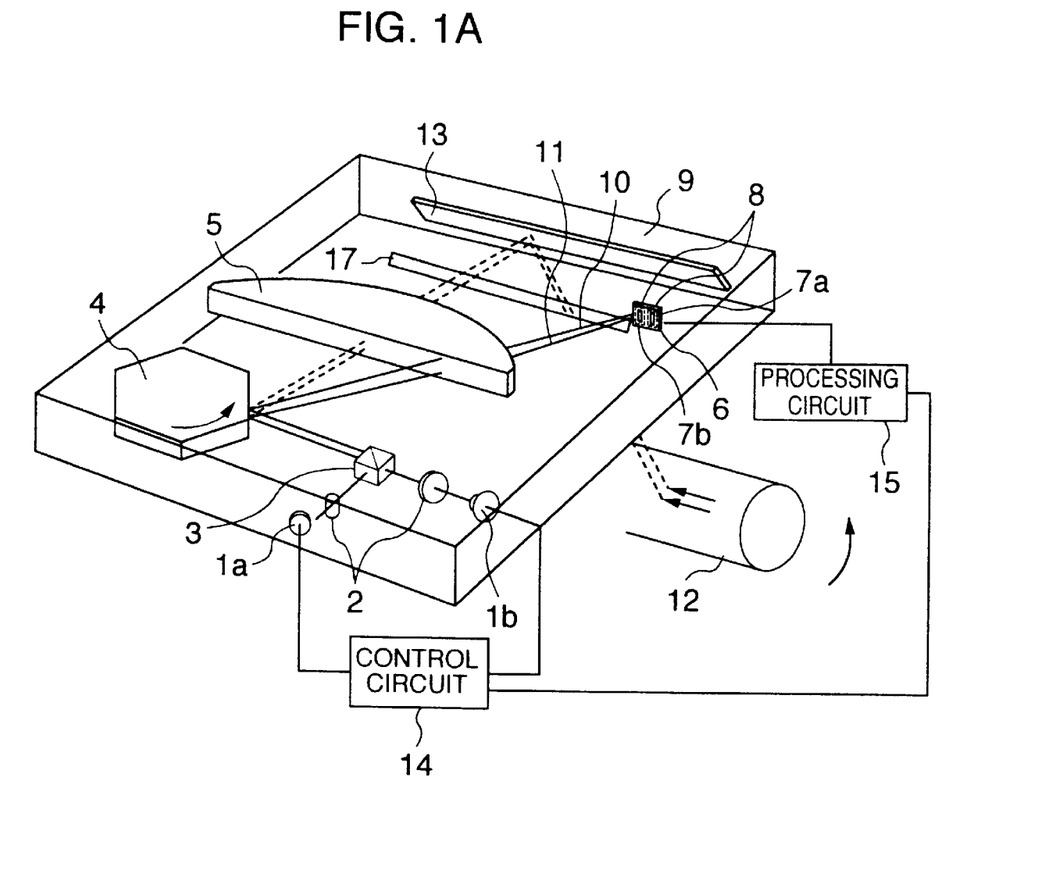
FIG. 1A is a schematic diagram illustrating a multi-optical beam scanning apparatus according to the present invention.
Figure 1B:
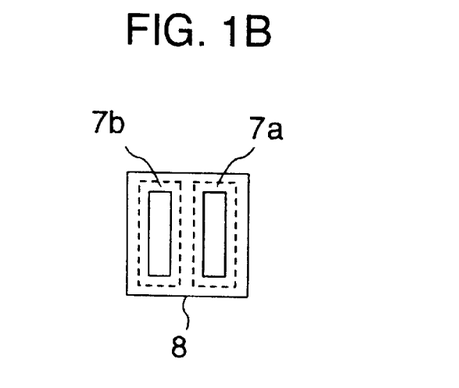
FIG. 1B is an enlarged view showing a main portion of the present invention.
Figure 5:
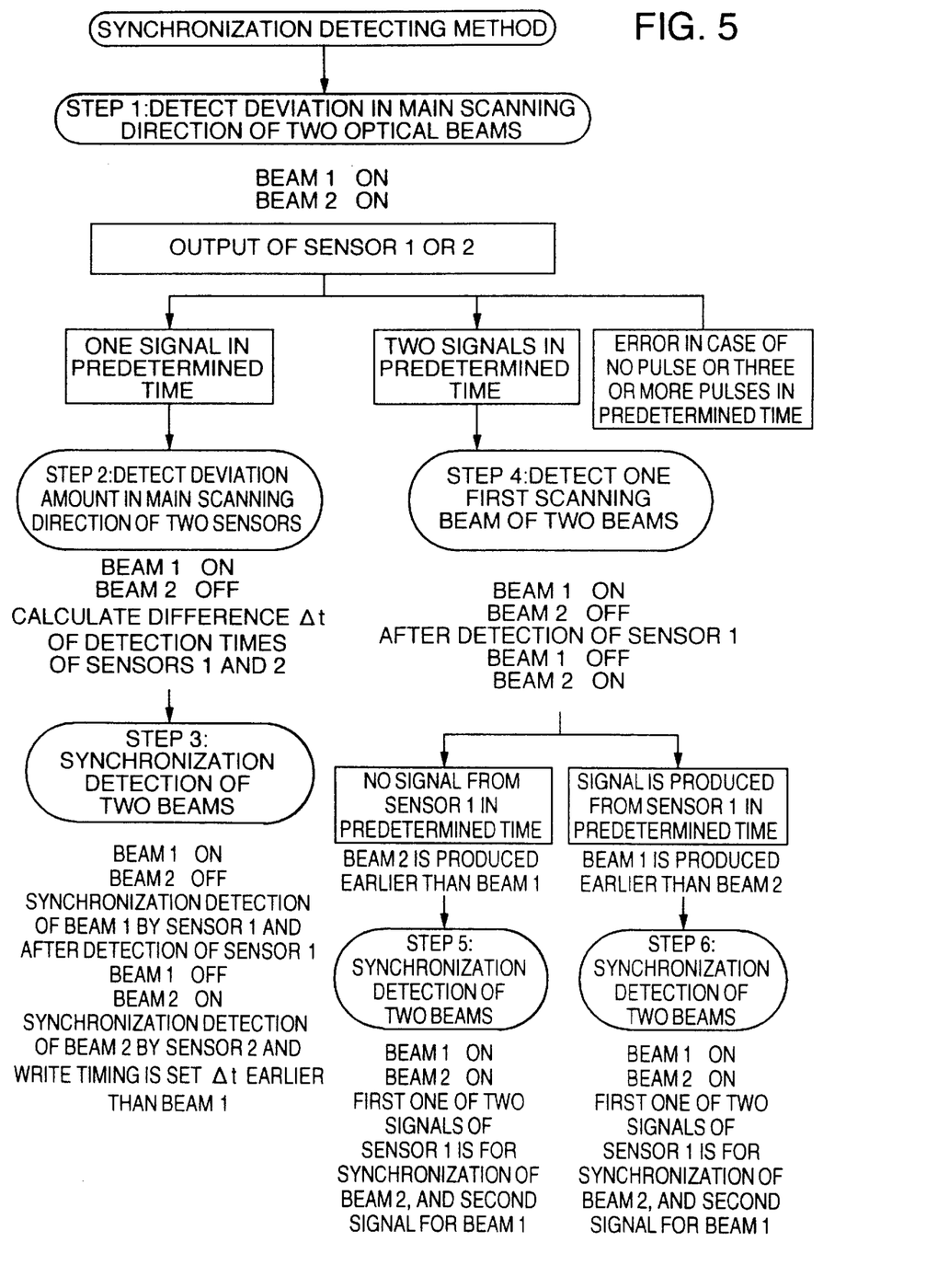
FIG. 5 is a flow chart of the synchronization detecting method of the present invention.
Figure 6A:
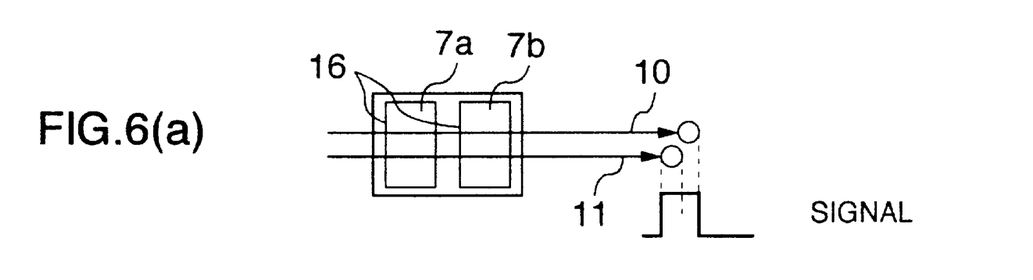
FIGS. 6(a) and 6(b) are diagrams showing states of optical beams which scan the synchronization detector of the present invention.
Figure 6B:
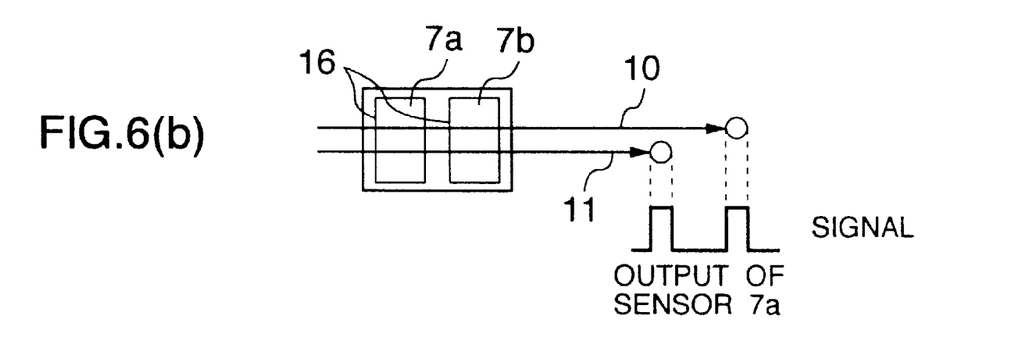

An embodiment of the present invention is now described. FIG. 1A schematically illustrates the multi-optical beam scanning apparatus according to the present invention and FIG. 1B is an enlarged view showing arrangement of light receiving sensors and a slit 8. FIG. 5 is a flow chart of the synchronization detecting method according to the present invention. FIGS. 6(*a*) and 6(*b*) show states of the optical beams which scan the synchronization detector of the present invention. FIGS. 6(*a*) and 6(*b*) show the case where scanning is made with two optical beams.

In FIG. 1A, the multi-optical beam scanning apparatus according the embodiment includes first and second optical sources 1*a* and 1*b* for emitting optical beams, shaping lenses 2 for shaping the optical beams from the first and second optical sources 1*a* and 1*b*, a beam splitter 3 for directing the two optical beams emitted from the shaping lenses 2 toward a predetermined position, a deflector 4 for deflecting the optical beams from the beam splitter 3, a scanning lens 5 for focusing the optical beams deflected from the deflector 4 on a surface 12 to be scanned, a synchronization detector 6 for detecting synchronization of the optical scanning beams, a light receiving sensor 7*a* of the synchronization detector 6 positioned on the side of the beginning of scanning of the optical beams, a light receiving sensor 7*b* of the synchronization detector 6 positioned in the main scanning direction of the light receiving sensor 7*a*, slits 8 disposed on the light reception side of the light receiving sensors 7*a* and 7*b*, a housing 9 for accommodating constituents of the apparatus, a mirror 13 for reflecting the optical beams from the scanning lens 5 on the surface 12 to be scanned, a control circuit 14 for controlling the first and second optical sources 1*a* and 1*b* and a processing circuit 15 for calculating detection of synchronization of a write timing from a signal of the synchronization detector 6. As shown in FIG. 1B on an enlarged scale, the synchronization detector 6 includes the slits 8 formed into stamped rectangles to be disposed on the light receiving sensors 7*a* and 7*b*.

Operation of the multi-optical beam scanning apparatus is now described.

First, when the multi-optical beam scanning apparatus receives a start signal, the first and second optical sources 1*a* and 1*b* emit light. Optical beams 10 and 11 emitted by the first and second optical sources 1*a* and 1*b* are shaped by the shaping lenses 2 into a predetermined condition and optical axes thereof are aligned with each other by the beam splitter 3 so that the optical beams are sent to the deflector 4. The deflector 4 may be generally a polygonal mirror, a galvano mirror, a hologram and the like and in FIG. 1 the polygonal mirror is used. The polygonal mirror is rotated at the equal or constant speed to thereby deflect the two optical beams 10 and 11 in the scanning direction and the deflected optical beams are focused by the scanning lens 5 on the surface 12 to be scanned. Before an image area is scanned by the optical beams 10 and 11, the light receiving sensors 7*a* and 7*b* are used to detect states of the optical beams 10 and 11 so that write timings of an image in an optimum image area is determined. For example, when the two optical beams 10 and 11 come close to each other in the main scanning direction, the sensors including the light receiving sensor 7*a* determined for the optical beam 10 and the light receiving sensor 7*b* determined for the optical beam 11, for example, produce signals independently, so that the write timing of the optical beams 10 and 11 can be synchronized on the basis of the signals.

Irradiation of light is made in accordance with image data by the optical scanning beams 10 and 11 synchronized with the write timing after a predetermined timing. In this manner, the two optical beams 10 and 11 scan the surface by means of the deflector 4 and the surface 12 to be scanned is continuously moved in the perpendicular direction (sub-scanning direction) to the main scanning direction while light is turned on and off, so that the image can be formed on the scanned surface 12 two-dimensionally.

As described above, the embodiment has like structures as in the prior art, but it has a characteristic structure in that the light receiving surfaces of the light receiving sensors 7*a* and 7*b* for detection of synchronization are arranged or juxtaposed in the main scanning direction of the optical beams.

The above case is an example of the multi-optical beam scanning such that two beams are arranged in the vertical direction (sub-scanning direction) and scanning is made with the two beams simultaneously. In order to detect the two optical beams to obtain the synchronization, the light receiving surfaces of the light receiving sensors 7a and 7b are arranged in the horizontal direction (main scanning direction) of the optical beams in the embodiment.

However, the relative positional relation of the two optical beams in the main scanning direction is varied in the main scanning direction due to the secular change or the deficiency in mounting of the sensors.

Accordingly, a method of synchronizing the two optical beams exactly even if the two beams are varied in the relative positional relation in the main scanning direction is required.

It is considered that there are a state where the two scanning optical beams come near each other in the main scanning direction and a state where the two optical beams are separated from each other considerably.

Figure 2A:
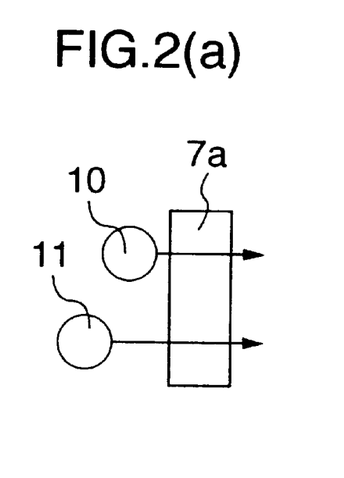
Figure 2B:
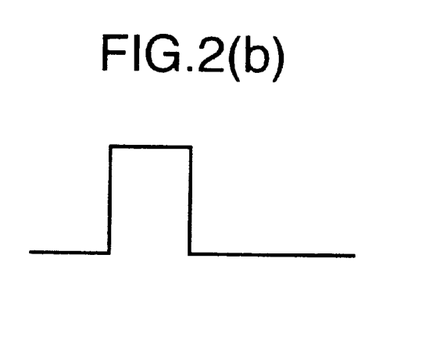

FIGS. 2(a) to 2(h) illustrate the synchronization detecting method in the case where two optical beams are shifted or displaced slightly in the main scanning direction. FIG. 2(a) shows the case where two close optical beams 10 and 11 pass across the light receiving sensor 7a. There is no problem if the optical beams 10 and 11 are aligned with each other in the sub-scanning direction (the signal of the light receiving sensor 7a can be used to synchronize the optical beams 10 and 11). However, when the optical beams are slightly shifted in the main scanning direction as shown in FIG. 2(a), the light receiving sensor 7a can not distinguish the optical beams 10 and 11 to produce a single pulse and accordingly it is impossible to synchronize the two optical beams accurately.

Figure 2C:
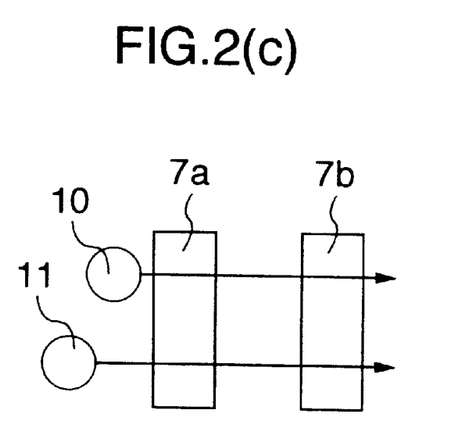

Thus, in such a case as shown in FIG. 2(c), two light receiving sensors 7a and 7b are arranged side by side in the main scanning direction to distinguish the two optical beams 10 and 11 so that, for example, the optical beam 10 is detected by the light receiving sensor 7a and the optical beam 11 is detected by the light receiving sensor 7b independently to synchronize the two optical beams.

Figure 2D:
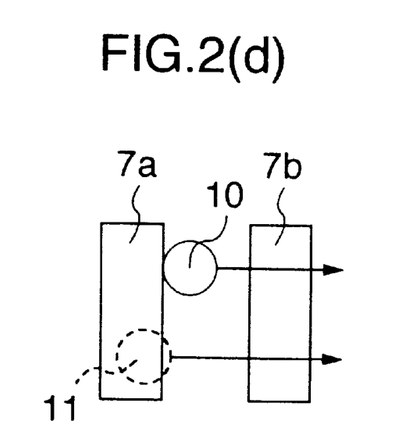
Figure 2E:
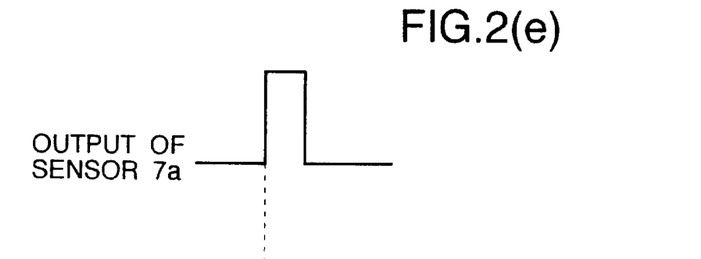
Figure 2F:
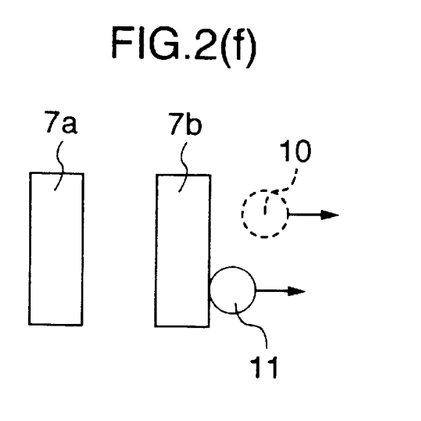
Figure 2G:
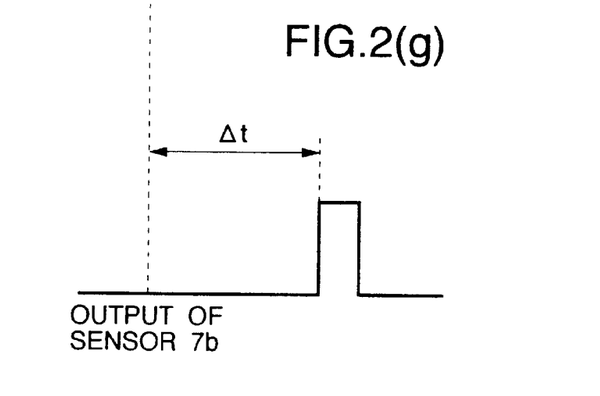

More particularly, as shown in FIG. 2(d), only the optical beam 10 is turned on and the other optical beam 11 is turned off to cause only the optical beam 10 to pass across the light receiving sensor 7a. Consequently, the light receiving sensor 7a produces a pulse by the optical beam 10 (FIG. 2(e)). Then, as shown in FIG. 2(f), the optical beam 10 is turned off just before the beam 10 comes to the light receiving sensor 7b and at the same time the optical beam 11 is turned on. When only the optical beam 11 being turned on passes across the light receiving sensor 7b, the light receiving sensor 7b produces a pulse by the optical beam 11 as shown in FIG. 2(g). Since the optical beams 10 and 11 come close to each other considerably as compared with the space between the light receiving sensors 7a and 7b, the signals can be produced by turning on and off the optical beams as described above. Since the light receiving sensors 7a and 7b are shifted in the main scanning direction to produce the signals, it is necessary to seek a distance between the light receiving sensors 7a and 7b in the main scanning direction in order to obtain synchronization of the write timing for image by each of the optical beams.

Figure 2H:
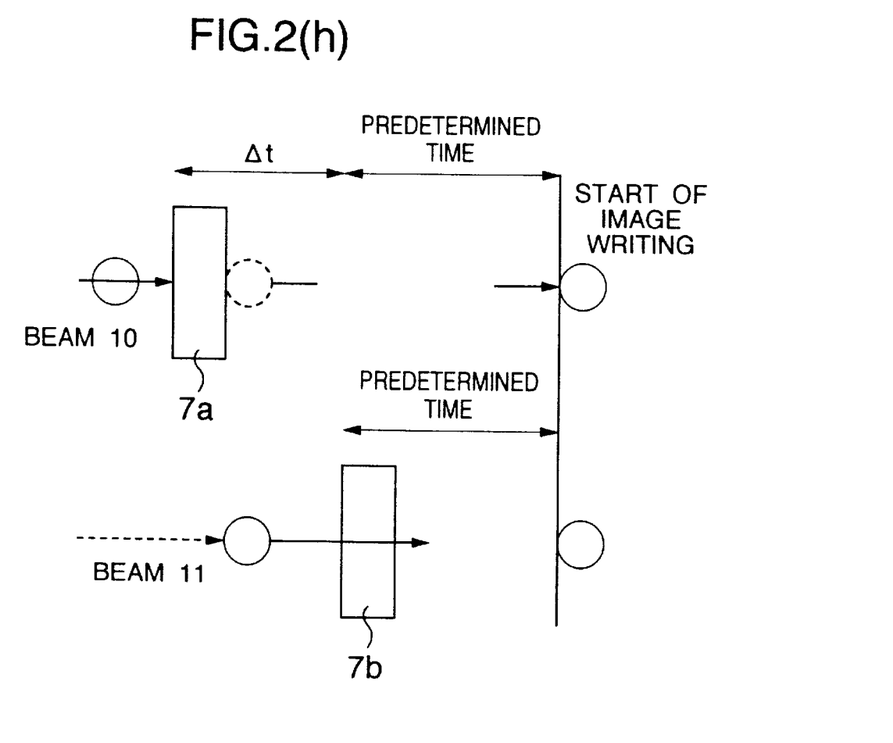

The space between the light receiving sensors 7a and 7b in the main scanning direction can be represented by a difference $\Delta t$ in time between the signals produced by the light receiving sensors 7a and 7b when only respective one of the optical beam 10 or 11 is turned on. That is, when the light receiving sensor 7b is used as a reference for the beginning of image writing, the optical beam 10 for the writing may be started at a timing obtained by adding a predetermined time and $\Delta t$ to the detection timing of the light receiving sensor 7a, and the optical beam 11 may be started at the predetermined timing from the detection of the light receiving sensor 7b. $\Delta t$ is measured before the beginning of printing and this measured value is used in printing (FIG. 2(h)). In FIG. 2(h), the sensors 7a and 7b are shown intentionally shifted in the sub-scanning direction for comparison of the time relation of the optical beams.

FIGS. 3(a) to 4(c) illustrate the synchronization detecting method in the case where the two optical beams are shifted largely. In this case, it is necessary to judge which of the optical beams 10 and 11 is advanced. The judgment method is now described.

Figure 3A:
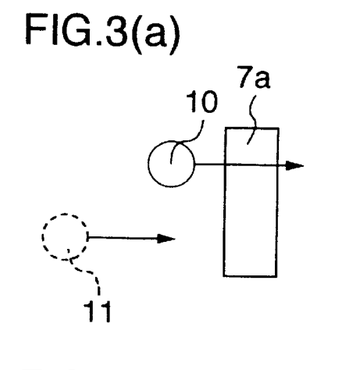
Figure 3B:
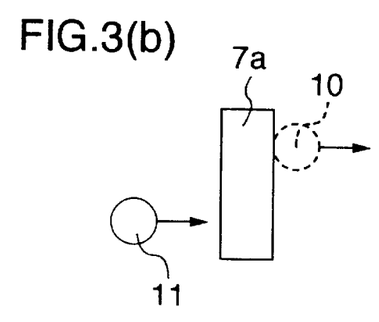
Figure 3C:
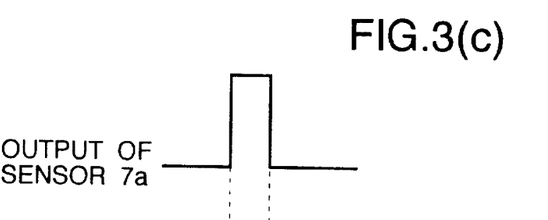
Figure 3D:
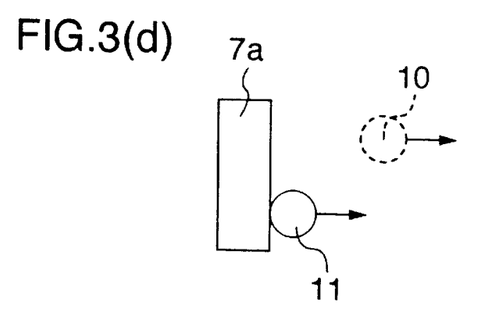
Figure 3E:
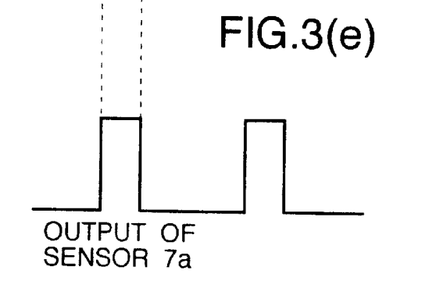

FIGS. 3(a) to 3(e) show the case where the optical beam 10 is advanced. When only the optical beam 10 is turned on and passes across the light receiving sensor 7a as shown in FIG. 3(a), only one pulse is produced as shown in FIG. 3(c). At the same time when the optical beam 10 has passed the light receiving sensor 7a, the optical beam 10 is turned off and the optical beam 11 is turned on (FIG. 3(b)). As shown in FIGS. 3(d) and 3(e), when the optical beam 11 passes across the light receiving sensor 7a, a second pulse is produced.

In other words, as described above, the two optical beams are turned on and off and the light receiving sensors detect the passage of the optical beams, so that occurrence or production of two pulses shows that the optical beam 10 is advanced as compared with the optical beam 11 and accordingly it is possible to make the synchronization.

Figure 4A:
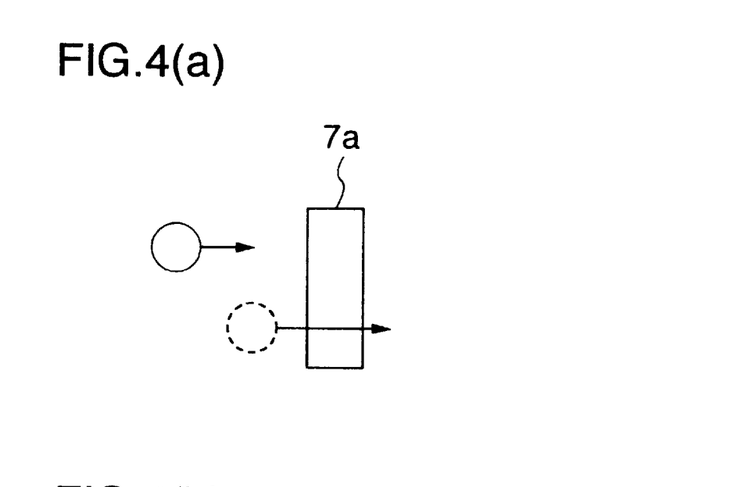
Figure 4B:
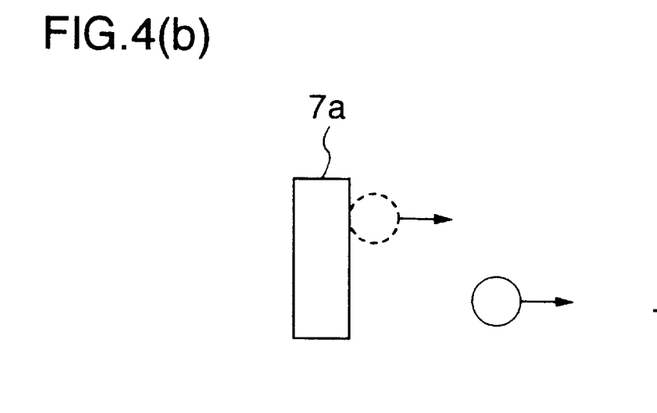
Figure 4C:
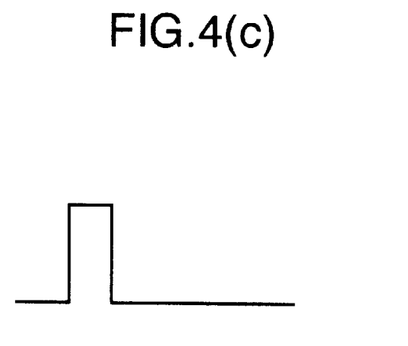

FIGS. 4(a) to 4(c) show the synchronization detecting method in the case where the optical beam 11 is advanced. In this case, when only the optical beam 10 is turned on and passes across the light receiving sensor 7a in the same manner as in FIG. 3(a), only one pulse is produced as shown in FIG. 4(c). At the same time when the optical beam 10 has passed the light receiving sensor 7a, the optical beams 10 is turned off and the optical beam 11 is turned on in the same manner as above. Since the optical beam 11 has already passed the light receiving sensor 7a when the optical beam 11 is turned on (FIG. 4(b)), the optical beam 11 is not detected by the light receiving sensor 7a and only one pulse is produced.

In other words, when only one pulse is produced, it is understood that the optical beam 11 is advanced as compared with the optical beam 10.

As described above, when the relative distance between the two optical beams in the main scanning direction is large, judgment as to which of the two optical beams is advanced can be made by checking whether one or two pulses are produced by turning on and off the optical beams. If judgment as to which of the optical beams is advanced can be made, the two time-sequential pulses obtained by the light receiving sensor 7a can be used to adjust the synchronization. For example, when the optical beam 10 is advanced, a first pulse may be used as a synchronization signal for the optical beam 10 and a second pulse may be used as a synchronization signal for the optical beam 11. With the above measures, the two optical beams can be synchronized regardless of a distance between the two optical beams in the main scanning direction.

Further, with the above structure, the light receiving sensors 7a and 7b are merely arranged on the main scanning line and can be mounted very simply. In addition, since the synchronization detecting method is attained in accordance with the situation of a plurality of optical scanning beams, the spaces of the light receiving sensors 7a and 7b in the main scanning direction can be set without paying specific attention.

Operation of the multi-optical beam scanning apparatus using the synchronization detecting methods mentioned above is now described with reference to the flow chart of FIG. 5. In FIG. 5, the optical beams 10 and 11 are represented as beams 1 and 2, respectively, and the light receiving sensors 7a and 7b are represented as sensors 1 and 2, respectively, for convenience.

The two optical beams 10 and 11 are set to be incident on the deflector 4 of a polygonal mirror at a predetermined angle, while the two optical beams are shifted relatively to each other in the main scanning direction due to adjustment errors or the like. Accordingly, in step 1, the processing circuit 15 judges how much the two optical scanning beams 10 and 11 are shifted (scarcely shifted (FIG. 6(a)) or considerably shifted (FIG. 6(b)), respectively, in the main scanning direction. The processing circuit 15 serves to detect the situation of the relative distance between the two optical beams in the main scanning direction and select the synchronization detecting method for the two optical beams on the basis of the signals from the light receiving sensors 7a and 7b to give conditions to the control circuit 14 which controls modulation of the laser. Accordingly, the two optical beams 10 and 11 are turned on (to emit light) by the control circuit 14 to make scanning with the beams. When the light receiving sensor 7a produces one signal within a predetermined time (time period when the two optical beams pass through the synchronization detector 6), it can be judged that the optical beams 10 and 11 considerably approach to each other with a shift in the main scanning direction within a slit width (FIG. 6(a)). Further, when two signals are detected by the light receiving sensor 7a within the predetermined time, it can be judged that the two optical beams 10 and 11 are separated by a slit width or more (FIG. 6(b)).

When one signal is produced (two optical scanning beams approach to each other considerably), the light receiving sensors 7a and 7b are used to synchronize write timings of the two optical beams 10 and 11. For this purpose, it is necessary to calculate a time difference Δt between the detection positions in the main scanning direction of the light receiving sensors 7a and 7b. Thus, in step 2, only the optical beam 10 is turned on (any one of the beams may be turned on) and the light receiving sensors 7a and 7b are scanned. A time difference Δt between the beam detections of the sensors is calculated. A difference of the write timings in the scanning direction of the light receiving sensors 7a and 7b can be determined in accordance with the time difference Δt.

After such conditions are determined, synchronization of two scanning beams 10 and 11 is detected. That is, as shown in step 3, the optical beam 10 is turned on and the optical beam 11 is turned off. Synchronizazion of the optical beam 10 is detected by the light receiving sensor 7a. Immediately after the detection of synchronization, the optical beam 10 is turned off and the optical beam 11 is turned on. The optical beam 11 is detected by the light receiving sensor 7b. The two optical beams 10 and 11 approach to each other considerably and when the optical beam 10 is detected by the light receiving sensor 7a, the optical beam 11 exists in the vicinity thereof. Accordingly, by the on-and-off switching operation of the optical beams 10 and 11, it becomes possible to detect synchronization by the light receiving sensor 7b. That is, synchronization of the optical beam 10 is made by relying upon the light receiving sensor 7a and synchronization of the light beam 11 is made by relying upon the light receiving sensor 7b. When the light receiving sensor 7b is used as the reference, the optical beam 10 may be started for the image writing at the timing of a predetermined time plus Δt and the optical beam 11 may be started for the image writing at the predetermined timing.

In step 1, when the light receiving sensor 7a produces two signals (the optical scanning beams are separated considerably), which of the optical beams 10 and 11 is first scanned must be judged. For this purpose, in step 4, the optical beam 10 is turned on and the optical beam 11 is turned off to make scanning with the beams. When the light receiving sensor 7a produces a signal, the optical beam 10 is turned off and the optical beam 11 is turned on. Thus, it can be judged that the optical beam 10 is advanced as compared with the optical beam 11 when a signal is detected by the light receiving sensor 7a within the predetermined time. It can be judged that the optical beam 11 is advanced as compared with the optical beam 10 when there is no second signal. For the detection of synchronization, the first detected signal of the two signals produced by the light receiving sensor 7a can be used for synchronization of the first scanned one of the optical scanning beams (for example, optical beam 10) and the next detected signal can be used for synchronization of the subsequent optical scanning beam (for example, optical beam 11). In the embodiment, the two optical beams 10 and 11 have been described, while the above method can be applied to the case where three or more optical scanning beams are used and synchronization can be taken by providing the light receiving sensors equal in number to the optical beams.

Figure 6C:
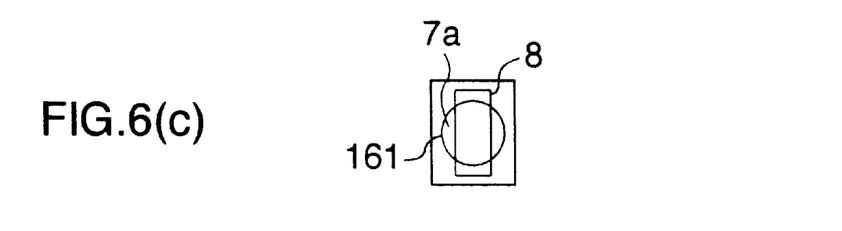
FIG. 6(c) is a diagram showing a relation of a shape of a surface of a light receiving sensor and a shape of a slit.

As described above, even if the plurality of optical scanning beams are separated by any distance in the scanning direction or even if the relative mounting positions in the scanning direction of the light receiving sensors for detection of synchronization are scattered uncontrollably, the desired detection of synchronization can be attained since such condition can be detected before printing. When the edge 16 of the light receiving surface of the light receiving sensor defines a straight line perpendicular to the main scanning direction of the optical beam, the position of detection of synchronization in the main scanning direction is not changed even if the optical scanning beams are shifted slightly (in the vertical direction (sub-scanning direction) of FIGS. 6(a), (b)). Such light receiving sensors can be used without a slit. When the edge of the light receiving surface of the light receiving sensor is not formed as above (for example, when the light receiving portion is formed with a circular edge 161 as shown in FIG. 6(c)), the slit 8 can be used to form the edge of the light receiving surface into a straight line in the orthogonal or vertical direction to the main scanning direction of the optical beam as the example of FIG. 1, so that the same effect as above can be obtained (FIG. 6(c)).

When the light receiving sensors arranged in the main scanning direction are not formed in one chip light receiving sensor divided in the scanning direction, common or usual light receiving sensors can be arranged to thereby obtain the same effect. As described above, in the embodiment, the light receiving sensors can be arranged in the main scanning direction and the above detection method of optical beam can be used to thereby detect synchronization of the plurality of optical beams with good accuracy.

As described above, according to the present invention, even if the plurality of optical beams are set in any state (when the plurality of optical beams come near in the scanning direction or are separated considerably), the synchronization detection of the write timing or the plurality of optical beams can be made.

Further, since tolerance upon adjustment in the scanning direction of the plurality of optical beams is large, setting can be easily made.

What is claimed is:

1. A synchronization detection method for a multi-beam optical scanning and image writing apparatus, said method comprising:
   (a) emitting a plurality of light beams, at least two of said beams being employed for synchronization of write timings for recording of images on a surface;
   (b) controlling said at least two light beams to scan said surface in parallel to each other along a main scanning direction and to write images on said surface;
   (c) employing a plurality of light sensors positioned side by side along said main scanning direction to detect said at least two light beams at a given position as said at least two light beams scan along said main scanning direction; and
   (d) processing output signals of at least two of said light sensors to determine synchronization of said write timings on the basis of a positional shift of said at least two light beams relative to one another in said main scanning direction.

2. A method according to claim 1, wherein said at least two light beams and said light sensors are equal in number.

3. A method according to claim 2, wherein said number is two.

4. A method according to claim 2, wherein said number is three or more.

5. A method according to claim 1, wherein in step (d), synchronization of said write timings is performed on the basis of outputs of said light sensors under a predetermined condition.

6. A method according to claim 5, wherein said predetermined condition includes predetermined ON/OFF states of said light beams while said at least two light beams are being controlled to scan said surface along said main scanning direction.

7. A synchronization detection method for a multi-beam optical scanning and image writing apparatus, said method comprising:
   (a) emitting a plurality of light beams;
   (b) controlling said light beams to scan said surface along a main scanning direction and to write images on said surface;
   (c) employing a plurality of light sensors positioned side by side along said main scanning direction to detect said light beams at a given position as said light beams scan along said main scanning direction; and
   (d) processing output signals of at least two of said light sensors to determine synchronization of write timings for said light beams for writing said images on said surface, wherein step (d) includes, in order to determine said synchronization of write timings for a first beam and a second beam of said plurality of light beams and while said plurality of light beams are being controlled to scan said surface along said main scanning direction,
      (i) turning both the first beam and the second beam ON,
      (ii) detecting whether a first one of said sensors produces one signal or two signals within a predetermined time period, and (iii) selecting a first synchronization technique when one signal is produced in step (d)(ii) and a second synchronization technique when two signals are produced in step (d)(ii).

8. A method according to claim 7, wherein:
   said first synchronization technique includes:
      (i) with only one beam of said first beam and said second beam turned ON, determining a time difference $\Delta t$ between detection of said one beam by one of (1) said first one of said sensors and (2) a second one of said sensors;
      (ii) with said one beam ON, detecting a time $t_1$ when said first one of said sensors detects said one beam, thereafter turning said one beam OFF and turning ON the other beam of said first beam and said second beam, and then detecting a time $t_2$ when said second one of said sensors detects said other beam; and
      (iii) determining said synchronization of write timings in accordance with $\Delta t$, $t_1$ and $t_2$; and
   said second synchronization technique includes:
      (i) with only one beam of said first beam and said second beam turned ON, determining when said first one of said sensors detects said one beam, thereafter turning OFF said one beam and turning ON the other beam of said first beam and said second beam, determining said one beam to be a lead beam if said first one of said sensors detects said other beam within a predetermined time period, and determining said other beam to be a lead beam if said first one of said sensors does not detect said other beam within a predetermined time period; and
      (ii) determining said synchronization of write timings by employing a first detected one of said two signals to synchronize said lead beam and a second detected one of said two signals to synchronize the other beam.

9. A multi-beam optical scanning and image writing apparatus, comprising:
   (a) a plurality of optical sources for emitting a plurality of light beams, at least two of said beams being employed for determining synchronized write timings for recording of images on a surface;
   (b) means for controlling said at least two light beams to scan said surface in parallel to each other along a main scanning direction and write images on said surface;
   (c) a plurality of light sensors arranged side by side along said main scanning direction to detect said at least two light beams at a given position as said at least two light beams scan along said main scanning direction; and
   (d) a processing circuit for processing outputs of at least two of said light sensors and for determining said synchronized write timings on the basis of a positional shift of said at least two light beams relative to one another in said main scanning direction.

10. An apparatus according to claim 9, further comprising a control circuit for controlling said plurality of optical sources to modulate said at least two light beams in accordance with image data provided to said control circuit, in synchronization with said write timings, and wherein said means for controlling includes a deflector for deflecting said at least two light beams emitted from said optical sources.

11. An apparatus according to claim 9, wherein said means for controlling causes said at least two light beams to be oriented along a sub-scanning direction which is perpendicular to said main scanning direction.

12. A multi-optical beam scanning apparatus according to claim 9, comprising slits disposed on an incident side of said plurality of light sensors and formed in parallel to a sub-scanning direction perpendicular to the main scanning direction of the at least two light beams.

13. A multi-optical beam scanning apparatus according to claim 9, wherein said plurality of light sensors are formed integrally on a single substrate.

14. A multi-optical beam scanning apparatus according to claim 10, wherein said plurality of light sensors are formed integrally on a single substrate.

15. A multi-beam optical scanning and image writing apparatus, comprising:
(a) a plurality of light sources for emitting a plurality of light beams, at least two of said beams being employed for synchronization of write timings for recording of images on a surface;
(b) means for controlling said at least two light beams to scan said surface along a main scanning direction and to write images on said surface;
(c) a plurality of light sensors positioned side by side along said main scanning direction to detect said at least two light beams at a given position as said at least two light beams scan along said main scanning direction; and
(d) a processing circuit for processing output signals of at least two of said light sensors to determine synchronization of said write timings for said at least two light beams for writing said images on said surface, wherein said processing circuit, in order to determine said synchronization of write timings for a first beam and a second beam of said at least two light beams and while said at least two light beams are being controlled to scan said surface along said main scanning direction, (i) turns both the first beam and the second beam ON, (ii) detects whether a first one of said sensors produces one signal or two signals within a predetermined time period, and (iii) selects a first synchronization technique when one signal is produced in step (d)(ii) and a second synchronization technique when two signals are produced in step (d)(ii).

16. An apparatus according to claim 15, wherein:
said first synchronization technique includes:
(i) with only one beam of said first beam and said second beam turned ON, determining a time difference $\Delta t$ between detection of said one beam by one of (1) said first one of said sensors and (2) a second one of said sensors;
(ii) with said one beam ON, detecting a time $t_1$ when said first one of said sensors detects said one beam, thereafter turning said one beam OFF and turning ON the other beam of said first beam and said second beam, and then detecting a time $t_2$ when said second one of said sensors detects said other beam; and
(iii) determining said synchronization of write timings in accordance with $\Delta t$, $t_1$ and $t_2$; and said second synchronization technique includes:
(i) with only one beam of said first beam and said second beam turned ON, determining when said first one of said sensors detects said one beam, thereafter turning OFF said one beam and turning ON the other beam of said first beam and said second beam, determining said one beam to be a lead beam if said first one of said sensors detects said other beam within a predetermined time period, and determining said other beam to be a lead beam if said first one of said sensors does not detect said other beam within a predetermined time period; and
(ii) determining said synchronization of write timings by employing a first detected one of said two signals to synchronize said lead beam and a second detected one of said two signals to synchronize the other beam.

* * * * *